United States Patent
Baldwin et al.

(10) Patent No.: US 9,181,881 B2
(45) Date of Patent: Nov. 10, 2015

(54) CO-AXIAL QUILL ASSEMBLY RETAINER AND DUAL FUEL COMMON RAIL ENGINE USING SAME

(75) Inventors: Daniel R. Baldwin, Peoria, IL (US); Dennis H. Gibson, Chillicothe, IL (US); Dana R. Coldren, Secor, IL (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 404 days.

(21) Appl. No.: 13/566,225

(22) Filed: Aug. 3, 2012

(65) Prior Publication Data

US 2014/0034020 A1    Feb. 6, 2014

(51) Int. Cl.
*F02M 21/02* (2006.01)
*F02D 19/06* (2006.01)

(52) U.S. Cl.
CPC ........ *F02D 19/0647* (2013.01); *F02D 19/0684* (2013.01); *F02D 19/0689* (2013.01); *F02D 19/0694* (2013.01); *F02M 21/0281* (2013.01); *F02M 21/0287* (2013.01); *Y02T 10/32* (2013.01); *Y02T 10/36* (2013.01); *Y10T 29/49231* (2015.01)

(58) Field of Classification Search
CPC ........... F02M 21/0287; F02M 21/0281; F02D 19/0647; F02D 19/0684; F02D 19/0689; F02D 19/0694
USPC ............. 29/888.01, 890; 210/167.19, 167.13, 210/184, 185, 321.69, 331, 338, 339, 439, 210/493.5, 495; 123/468, 469, 575, 525, 123/470, 456; 55/490, 495, 504; 285/286.1, 285/382.5, 121.1, 123.1, 123.4, 123.5, 285/123.6, 123.13; 239/533.2, 533.5
See application file for complete search history.

(56) References Cited

U.S. PATENT DOCUMENTS

| | | | |
|---|---|---|---|
| 6,105,789 A * | 8/2000 | Boast | 210/495 |
| 6,234,413 B1 | 5/2001 | Greaney | |
| 6,431,150 B1 | 8/2002 | Pearlman et al. | |
| 6,604,509 B1 | 8/2003 | Hegner | |
| 6,840,225 B2 | 1/2005 | Sandoval | |
| 7,624,788 B2 * | 12/2009 | Brown et al. | 165/83 |
| 7,958,870 B2 | 6/2011 | Bonfigli et al. | |
| 8,272,368 B2 * | 9/2012 | Wickstone | 123/468 |
| 2004/0134553 A1 * | 7/2004 | Ichimura et al. | 138/114 |
| 2005/0051310 A1 * | 3/2005 | Inoue et al. | 165/154 |
| 2005/0166899 A1 * | 8/2005 | Shamine et al. | 123/456 |
| 2007/0267337 A1 * | 11/2007 | Yang | 210/338 |
| 2011/0108004 A1 | 5/2011 | Wickstone | |
| 2012/0012083 A1 | 1/2012 | Tower et al. | |
| 2012/0055448 A1 | 3/2012 | Kim et al. | |
| 2012/0234296 A1 * | 9/2012 | Graspeuntner et al. | 123/469 |
| 2013/0327296 A1 * | 12/2013 | Gibson et al. | 123/456 |

(Continued)

*Primary Examiner* — Lindsay Low
*Assistant Examiner* — George Jin

(57) ABSTRACT

A dual fuel common rail engine supplies pressurized natural gas and liquid diesel fuel at different pressures through a co-axial quill assembly for direct injection from a single fuel injector into an engine cylinder. Each coaxial quill assembly includes a matched pair of inner and outer quills that are chosen to have dimensions that allow both quills to sealingly engage each fuel injector at a common conical seat responsive to a clamping force applied along an axis. Matched pairs of inner and outer quills are retained together during pre-installation handling with a retainer that is left between the inner and outer quills after installation in an engine.

15 Claims, 6 Drawing Sheets

(56) References Cited

U.S. PATENT DOCUMENTS

| | | | |
|---|---|---|---|
| 5,617,828 A * | 4/1997 | Kuegel et al. | 123/468 |
| 6,092,363 A | 7/2000 | Ryan | |
| 2014/0000563 A1 * | 1/2014 | Hackett | 123/456 |
| 2014/0034019 A1 * | 2/2014 | Mittal et al. | 123/456 |
| 2014/0034020 A1 * | 2/2014 | Baldwin et al. | 123/456 |
| 2014/0034023 A1 * | 2/2014 | Coldren | 123/472 |

* cited by examiner

US 9,181,881 B2

CO-AXIAL QUILL ASSEMBLY RETAINER AND DUAL FUEL COMMON RAIL ENGINE USING SAME

TECHNICAL FIELD

The present disclosure relates generally to dual fuel common rail engines, and more particularly to a matched pair of inner and outer quills retained together with a retainer.

BACKGROUND

Co-owned U.S. Patent application publication 2012/0055448 shows a co-axial quill assembly for a dual fuel common rail system in which inner and outer quills sealingly engage a common conical seat on individual fuel injectors. That references teaches the utilization of separate loading devices to ensure that the inner and outer quills sealingly engage the fuel injector despite dimensional tolerance variations that would be expected during the manufacture of the individual inner and outer quills, fuel injector and other engine components. While such a strategy may permit any outer quill to be matched with any inner quill at the time the fuel system is assembled to an engine, the separate loading strategy for each quill may be cumbersome and occupy more space than desirable in and around the engine.

The present disclosure is directed toward one or more of the problems set forth above.

SUMMARY

A co-axial quill assembly for a dual fuel common rail fuel system includes a block that defines a liquid fuel passage that opens into a quill chamber through a conical seat, and defines a gaseous fuel passage that opens into the quill chamber outside of the conical seat. An inner quill defines a liquid fuel conduit extending between a first end and a second end, and the first end includes an annular spherical surface resting in contact with, but unattached to, the conical seat. An outer quill has a hollow interior separating a first end from a second end, and the first end being received in the quill chamber. A gaseous fuel conduit extends between an outer surface of the inner quill and an inner surface of the outer quill. An annular seal prevents gaseous fuel from escaping from the gaseous fuel conduit between the block and the outer quill. A retainer is in contact with the outer surface of the inner quill and the inner surface of the outer quill for maintaining the inner quill with the outer quill during pre-installation handling. A gage line at the second end of the inner quill extends a predetermined target distance beyond a gage line at the second end of the outer quill so that the inner and outer quills seat on a common conical seat responsive to a predetermined load on the block along an axis.

In another aspect, a dual fuel engine includes an engine housing that defines a plurality of cylinders. A dual fuel common rail system includes exactly one fuel injector positioned for direct injection in each of the plurality of cylinders. A gaseous fuel common rail and a liquid fuel common rail are fluidly connected to each fuel injector, and a co-axial quill assembly with inner and outer quills are in sealing contact with a common conical seat of each fuel injector. The inner quill is out of contact with the outer quill for each co-axial quill assembly. The co-axial quill assembly includes a retainer in contact with an outer surface of the inner quill and an inner surface of the outer quill for maintaining the inner quill with the outer quill during pre-installation handling. The inner quill and the outer quill of each co-axial quill assembly are a matched pair such that a gage line at an end of the inner quill extends a pre-determined target distance beyond a gage line at an end of the outer quill so that the inner and outer quills seat on the common conical seat responsive to a pre-determined load on the co-axial quill assembly along an axis.

In another aspect, a method of assembling a fuel system includes pre-assembling a plurality of quill assemblies to each include a block, an inner quill and an outer quill. A first common rail and a second common rail are fluidly connected to a plurality of fuel injectors with the plurality of quill assemblies by clamping the inner quill between a conical seat of the block and a common conical seat of a respective fuel injector. The pre-assembling step includes matching an inner quill and an outer quill for each of the quill assemblies such that a gage line at an end of the inner quill extends a predetermined target distance beyond a gage line at an end of the outer quill so that the inner and outer quills seat on the common conical seat responsive to a predetermined load on the co-axial quill assembly along an axis. The matched inner and outer quills are retained together during pre-installation handling with a retainer positioned between the inner and outer quills. The retainers are left in place between the respective inner and outer quills after the fluid connecting step.

DETAILED DESCRIPTION

Figure 1:
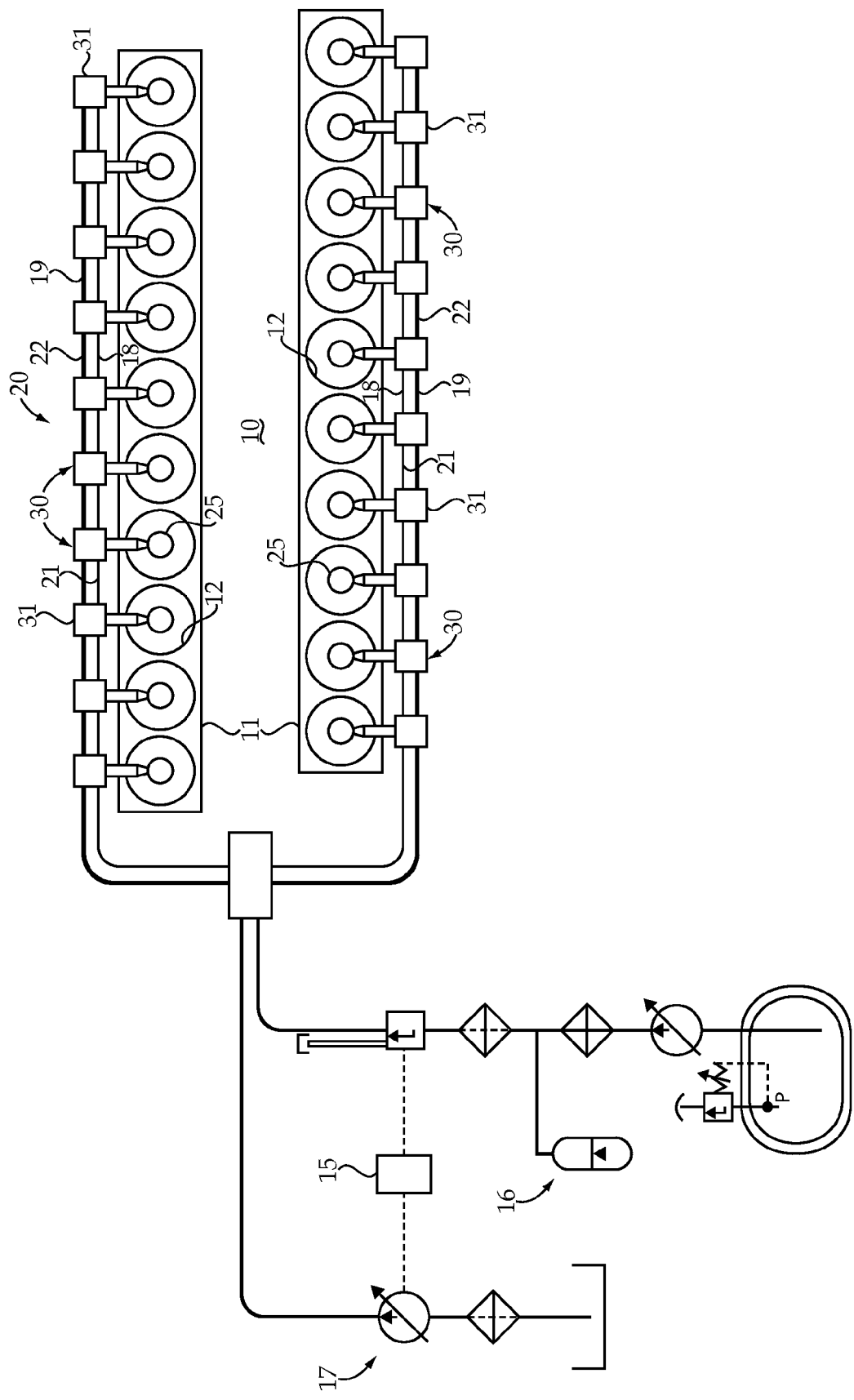
FIG. 1 is a schematic view of a dual fuel engine according to the present disclosure.
Figure 2:
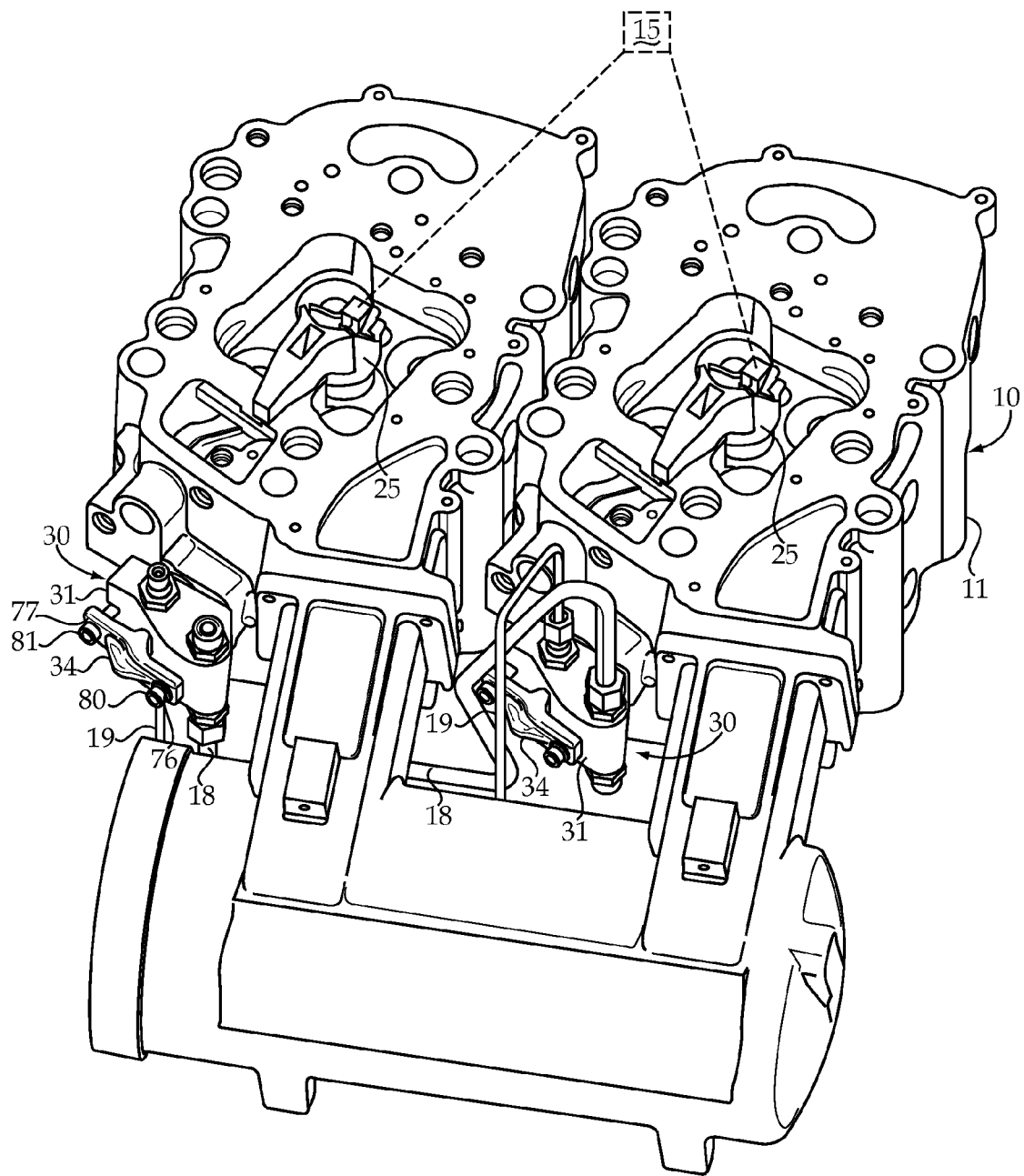
FIG. 2 is a perspective view of a portion of the engine and dual fuel common rail system for the engine of FIG. 1.
Figure 3:
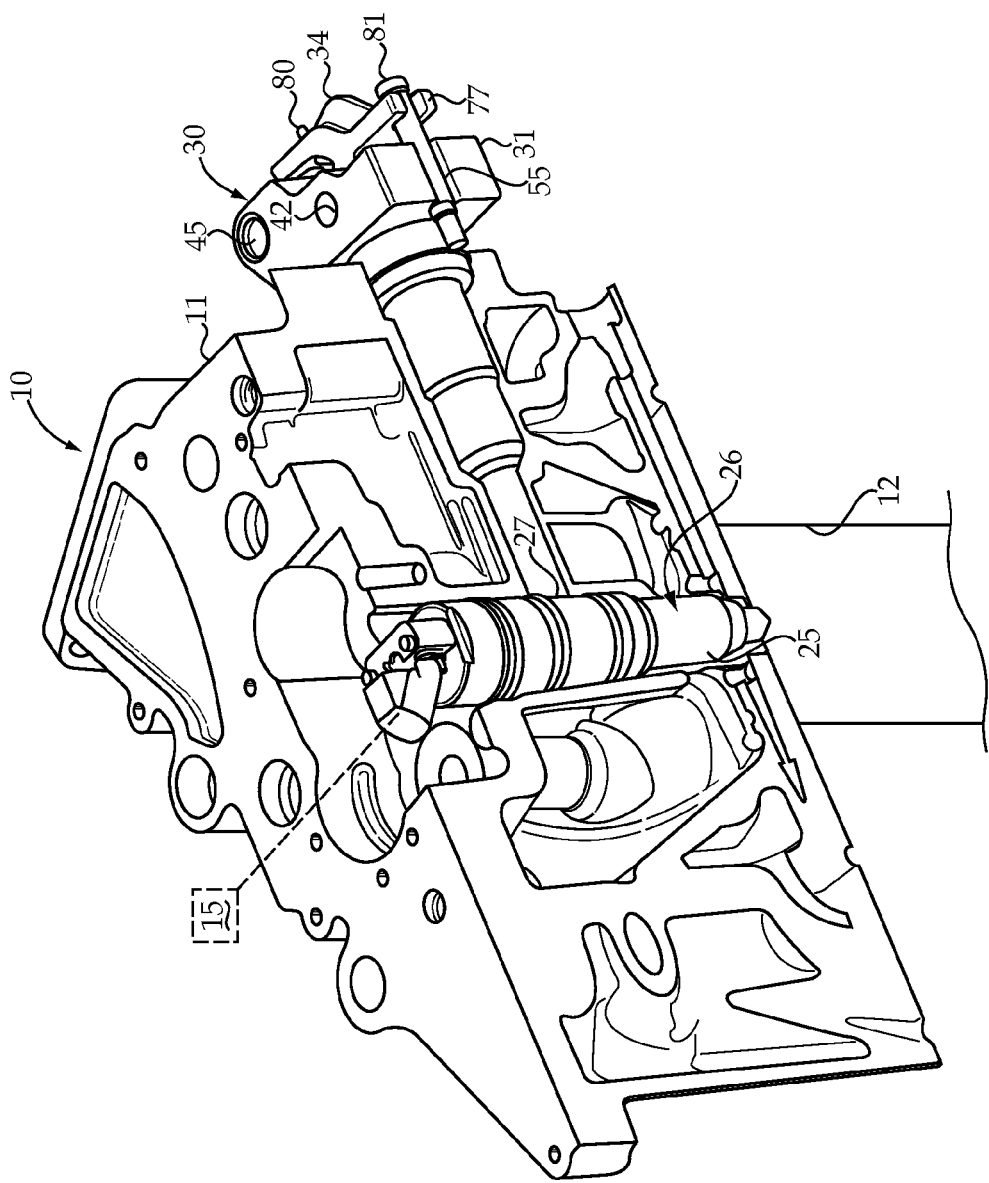
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are controlled by an electronic engine controller 15 in a known manner. The gas supply and pressure control devices 16 may include a pressurized cryogenic liquid natural gas tank with an outlet fluidly connected to a variable delivery cryogenic pump. Devices 16 may also include a heat exchanger, an accumulator, a gas filter and a fuel conditioning module that controls the supply and pressure of gaseous fuel to gaseous fuel common rail 21. The liquid supply and pressure control devices 17 may include a diesel fuel tank, fuel filters and an electronically controlled high pressure fuel pump that supply liquid fuel to, and control pressure in, liquid fuel common rail 22.

As best shown in FIGS. 1 and 2, the blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2.

Figure 4:
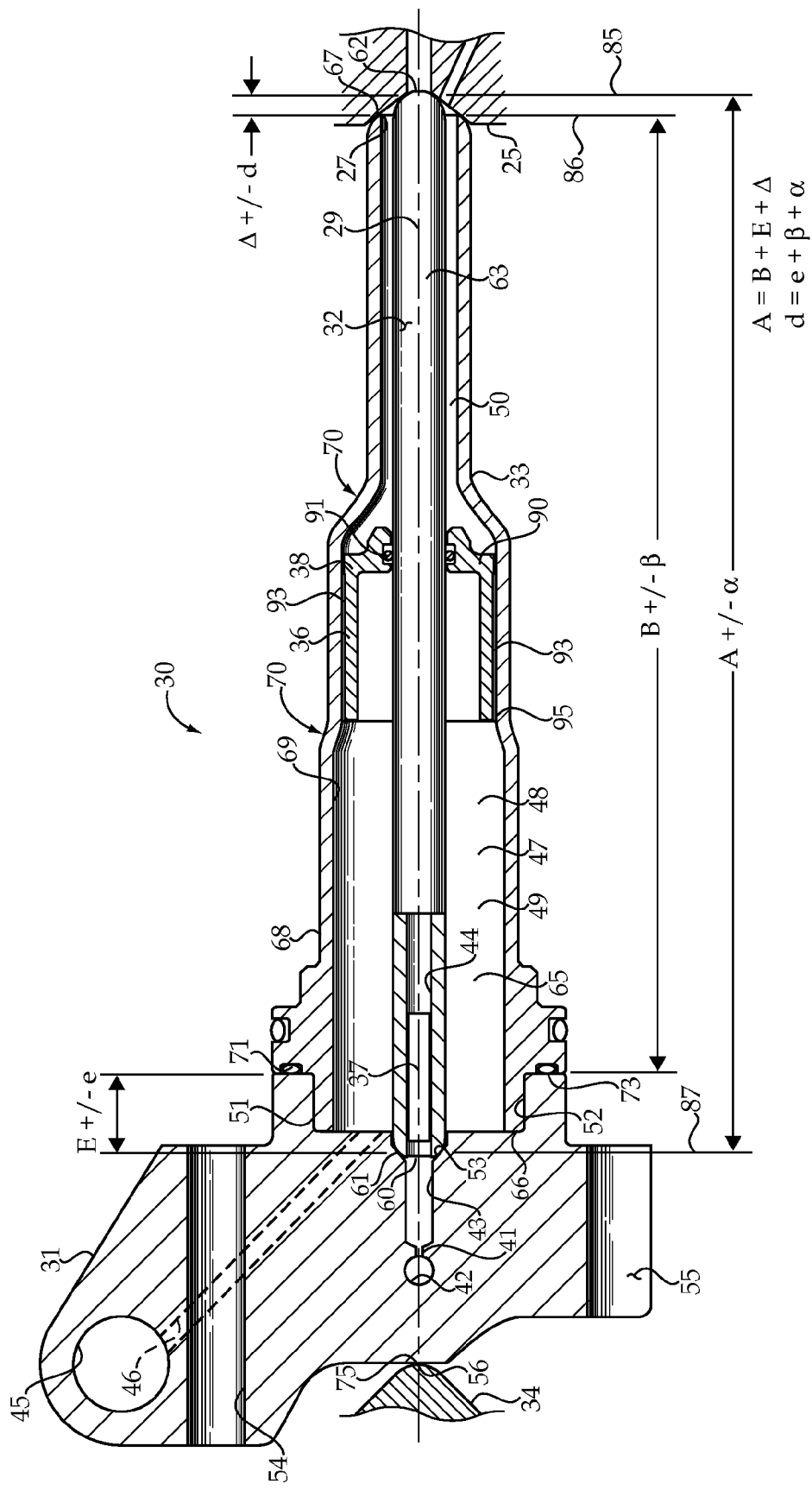
FIG. 4 is a sectioned side view through a co-axial quill assembly according to another aspect of the present disclosure.

Referring in addition to FIG. 4, the dual fuel common rail system 20 includes a co-axial quill assembly 30 with an inner quill 32 and an outer quill 33 in sealing contact with a common conical seat 27 of each fuel injector 25. In the illustrated embodiment, a pressure damping chamber 48 consists of an upstream segment 49 of the gaseous fuel conduit 47 that has a flow area at least several times larger than the downstream segment 50 of the gaseous fuel conduit 47. The pressure damping chamber 48 is defined in each co-axial quill assembly 30 in order to damp pressure waves moving from gaseous fuel common rail 21 toward the respective fuel injector 25, especially during an injection event. The pressure damping chamber 48 has a volume greater than a gaseous fuel volume 26 (nozzle chamber, sac and gas passageways) within the respective fuel injector 25. Those skilled in the art will appreciate that the available space constraints on fuel injector 25 limit the size of the gaseous fuel volume 26 within each fuel injector 25. The gas volume 26 in each fuel injector may likely be many times less than a rated gaseous injection volume from injector 25.

Figure 7:
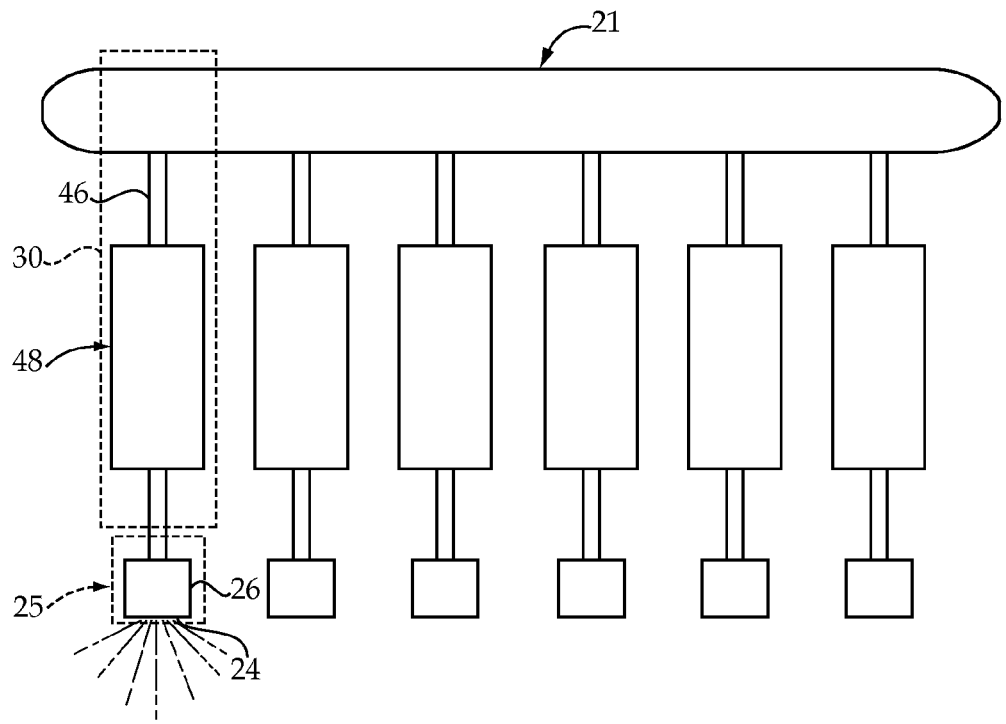
FIG. 7 is a volume schematic of a gaseous portion of the common rail fuel system for the engine of FIG. 1.

One strategy for sizing the pressure damping chamber 48 may start with the continuity equation, and then derive an equation for the pressure response of a particular fluid (e.g. natural gas) in a specific volume (the pressure damping chamber 48) to a flow rate arriving (from the rail 21) to a flow rate leaving the volume (injection rate). The idea is to reduce the pressure change reaction to the volume flow of the fluid to a satisfactory level. The pressure damping chamber 48 should provide sufficient absorbtion of arriving pressure waves to damp out reflective transients. Thus, one might consider a maximum rated volume of gaseous fuel delivery for fuel injector 25 in the engine 10, and the gas injection pressure, and size a volume of the pressure damping chamber 48 that will provide sufficient absorbtion of the pressure waves. FIG. 7 shows the relative volumes of the gaseous fuel common rail 21, the pressure damping chamber 48 and the injector gas volume 26 for the illustrated engine 10.

Referring again to FIGS. 2-4, each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. Fastener 80 may include a spherical washer and bolt, while fastener 81 may be a shoulder bolt that is utilized to set an attitude of load adjustment clamp 34. For instance, the proper assembly may require connection of co-axial quill assembly 30 to engine housing 11 with first fastener 81. Bolt 80 can then be tightened to a pre-determined torque that assures proper seating seal contact between outer quill 33 and inner quill 32, independently but simultaneously, on common conical seat 27 of fuel injector 25. During this process, load adjustment clamp 34 will pivot through some limited small angle. The fasteners 80 and 81 are received in fastener bore 54 and fastener slot 55, respectively of blocks 31.

Each block 31 of each co-axial quill assembly 30 defines a gaseous rail passage 45 that is oriented perpendicular to the axis 29 of inner quill 32 and fluidly connected to a gaseous fuel passage 46 that opens at one end into a quill chamber 52 outside of conical seat 53. The gaseous rail passage 45 may extend completely through block 31 in order to facilitate the daisy chain connection structure shown in FIGS. 1 and 2. Each block 31 also includes a liquid rail passage 42, which may extend all the way through, and that is oriented perpendicular to the axis 29 and fluidly connected to a liquid fuel passage 43 that opens on one end into quill chamber 52 through conical seat 53. A segment of liquid fuel passage 43 may have an orifice segment 41, as shown, to reduce a flow rate from the liquid rail 22 to help manage transients in the liquid quill 32. The minimum area required for the orifice 41 may be computed by dividing the total injection quantity by the injection duration, and sizing the orifice to allow that delivery with a minimum pressure drop. Thus, the sizing of that flow area may relate to the performance characteristics of fuel injector 25. The inner quill 32 defines a liquid fuel conduit 44 extending between a first end 60 and a second end 62. First end 60 includes an annular spherical surface 61 that rests in contact at a gage line 87 with, but remains unattached to, the conical seat 53, and a gage line 85 on an annular spherical surface at second end 62 in contact with common conical seat 27 of fuel injector 25. The outer quill 33 has a hollow interior 65 separating a first end 66 from a second end 67. The first end 66 is received in the quill chamber 52, and the outer quill 33 may be attached to block 31 with mating threads 51.

Practical manufacturing limitations may forbid mass production of co-axial quill assemblies 30 in which either the inner quill 32 or the outer quill 33 are integrally formed with block 31, or each other. Thus, an annular seal 71 serves to seal against leakage of gaseous fuel from between block 31 and outer quill 33 of co-axial quill assembly 30. In this embodiment, annular seal 71 includes an o-ring 73 in a face seal configuration trapped between block 31 and outer quill 33. In the illustrated construction, the inner quill 32 is out of contact with the outer quill 33 in each co-axial quill assembly 30. A gaseous fuel conduit 47 is fluidly connected to gaseous fuel passage 46, and also extends between outer surface 63 of inner quill 32 and the inner surface 69 of outer quill 33. Spatial constraints in engine housing 11 may require that an upstream half 49 of the gaseous fuel conduit 47 have a pressure damping chamber 48 with a volume larger than a volume of a downstream half 50 of the gaseous fuel conduit 47. Thus, a majority of the volume of the pressure damping chamber 48 may be located in an upstream half 49 of the gaseous fuel conduit 47 both within outer quill 33 and within quill chamber 52. As stated earlier, the pressure damping chamber 48 should be of sufficient size and shape to damp pressure waves arriving from the gaseous fuel passage 46 in order to reduce variations in gaseous fuel injection rates and quantities. In this specific example, the available space in engine housing 11 may permit the relatively uniform wall thickness of the outer quill 33, which is defined between an inner surface 69 and outer surface 68, to include two step wise diameter reductions 70 along the axis 29 in a direction of second end 67. Nevertheless, other engine housing geometries may vary substantially from that shown. The gaseous rail passage 45 of each block 31 may define a portion of the gaseous fuel common rail 22. Likewise, the liquid rail passage 42 of each block 31 may define a segment of the liquid fuel common rail 21 as best shown in FIGS. 1 and 2.

Referring more specifically to FIG. 4, reliable sealing contact between the co-axial quill assembly 30 and fuel injector 25 against leakage of both gaseous and liquid fuels may be accomplished by tightening only a single fastener 80 to a predetermined torque load. This may be accomplished by locating the gage line 85 at the second end 62 of the inner quill 32 to extend a predetermined target distance Δ beyond the gage line 86 at the second end 67 of the outer quill 33. The gage line 85, 86 is the sealing contact line. A predetermined load may be placed on block 31 by load adjusting clamp 34 acting along axis 29 so that the outer and inner quills 33, 32 seat and sealingly engage on common conical seat 27 at their respective gage lines 85, 86. Tightly controlling the predetermined target distance Δ may be accomplished in a number of ways. In the illustrated embodiment, target distance Δ is held to a tolerance d that is a stack up of tolerance e, β and α. Dimension distance E+/−tolerance e corresponds to the distance between the gage line of conical seat 53 and the shoulder face against which o-ring 73 seals on block 31. Dimension distance B+/−tolerance β corresponds to the distance from the shoulder surface of outer quill 33 to the gage line 86 at second end 67 of outer quill 33. Dimension distance A+/−tolerance α corresponds to the distance between the gage lines 87, 85 at opposite ends of inner quill 32. Provided that the distances A, B and E can be held within reasonable tolerances, the tolerance stack up d on target distance Δ can be made acceptable such that proper sealing at conical seat 27 of fuel injector 25 is reliably made. Tolerance stack up d equals e plus β and α. During preassembly, the predetermined target distance Δ may be set within an acceptable tolerance d by selecting a block 31 with an appropriate dimension distance E+/−e, an outer quill 33 with an appropriate dimension distance B+/−β, and a inner quill 32 with an appropriate dimension distance A+/−α. Provided that the tolerance stack up of e+B+A yields an acceptable tolerance d. A simple nearly fool proof installation may be assured by simply tightening a single fastener 80 to an appropriate torque load to apply an appropriate load along centerline 29.

Those skilled in the art will appreciate that the inner and outer quills 32, 33 may have different spring rates and may require different load levels to ensure proper sealing at common conical seat 27. Therefore, some differential length, which may be positive, negative or zero, depending upon the specific design, quill materials and geometries may need to be added to the above described dimensions in order to ensure proper sealing contact at fuel injectors 25.

Figure 8:
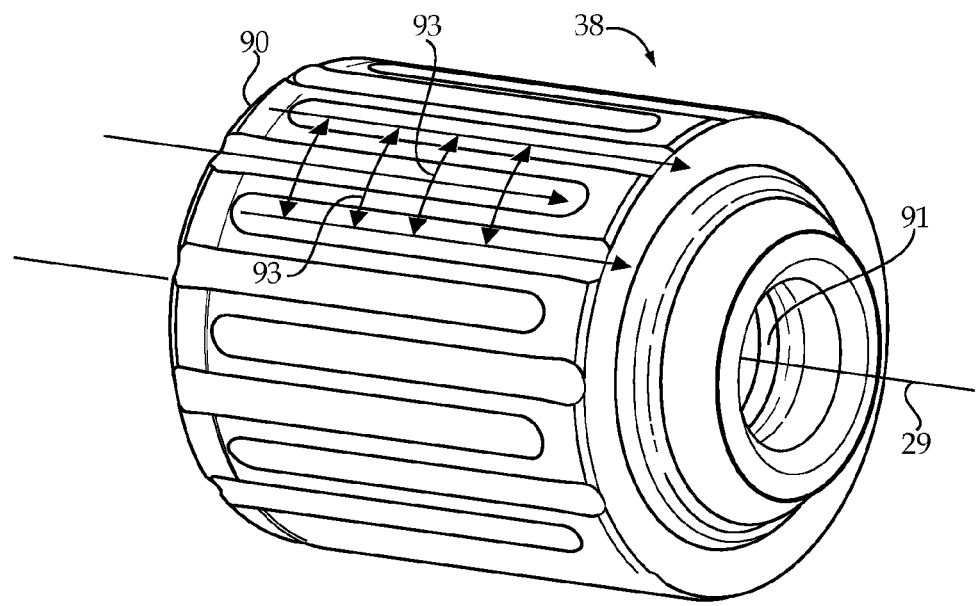
FIG. 8 is a perspective view of a retainer from the quill assembly of FIG. 4.

In order to trap debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner quill 32. The gaseous fuel edge filter 36 is shown positioned within outer quill 33 between the two step wise diameter reductions 70. In the illustrated embodiment, gaseous fuel edge filer 36 may have a combined dual purpose by including a retainer 38 that can be thought of as in contact with the inner surface 69 of outer quill 33 and of the outer surface 63 of inner quill 32. In this embodiment, retainer 38 may include an o-ring 91 that encourages gaseous fuel traveling along gaseous fuel conduit 47 to move through filter passages 93 between edge filter 36 and outer quill 33 to trap debris upstream from fuel injector 25. FIG. 8 shows an enlarged perspective view of retainer 38 and shows that the outer surface includes a plurality of filter passages 93 that are distributed around, and oriented perpendicular to the axis 29. In this embodiment, retainer 38 may comprise a suitable metallic piece, such as steel, that is machined to the shape as shown and also includes an o-ring 91 that grips the outer surface 63 of inner quill 32. Retainer 38 may be connected to the outer quill 33 with a metal to metal interference fit 95.

Because inner quill 32 is unattached to either outer quill 33 or block 31, co-axial quill assembly 30 may include the retainer 38 that is in contact with the outer surface 63 to maintain the inner quill 32 with the block 31 and outer quill 33 during pre-installation handling. In other words, retainer 38 may inhibit inner quill 32 from falling out of outer quill 33 during pre-installation handling. The edge filter 36/retainer 38 of the disclosure allows the co-axial quill assemblies 30 to be preassembled with a precisely predetermined target distance Δ so that installation is made easy and simple without the need for custom adjustments at each co-axial quill assembly 30. In the illustrated embodiment, consistent leak free installation may only require torqueing fastener 80 to a predetermined load, without any other considerations.

Figure 5:
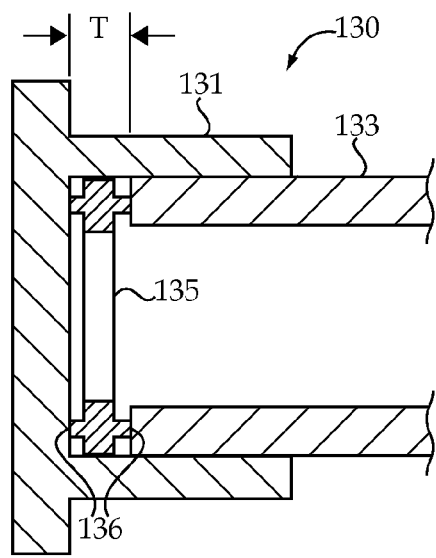
FIG. 5 is a partial sectioned side view through a co-axial quill assembly according to another aspect of the present disclosure.
Figure 6:
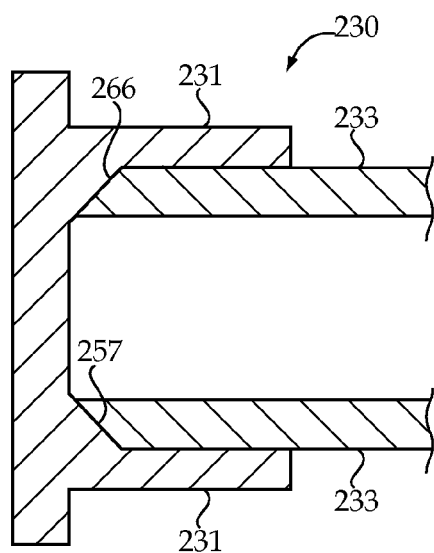
FIG. 6 is a partial sectioned side view through a co-axial quill assembly according to still another aspect of the present disclosure.

Referring now in addition to FIGS. 5 and 6, two additional embodiments of the co-axial quill assembly are shown in which different sealing strategies are utilized to prevent gaseous fuel leakage from between the block and the outer quill. In particular, FIG. 5 shows a portion of a co-axial quill assembly 130 in which a shim 135 has elevated annular sealing lands 136 on opposite sides that bear against block 131 and one end of outer quill 133 when the co-axial quill assembly 130 is installed in engine 10 with load adjusting clamp 34 discussed earlier. Thus, in this embodiment the annular seal that prevents leakage of gaseous fuel from between block 131 and outer quill 133 occurs at elevated sealing lands 136. In addition, this embodiment may utilize a category part shim 135 with variable thicknesses T that helps to set the predetermined target distance Δ for proper sealing of the second ends of the inner and outer quills in the common conical seat 27 of fuel injector 25 (FIG. 4). FIG. 6 shows still another alternative in which the annular seal that prevents gaseous fuel from leaking between block 231 and outer quill 233 is accomplished by loading the tapered end 266 of outer quill 233 against a tapered seat 257 formed in block 231. In either of the alternative co-axial quill assemblies 130 or 230, additional sealing or alternative sealing may be accomplished by an annular weld or braze, if desired, between outer quill 133 and block 131.

Figure 9:
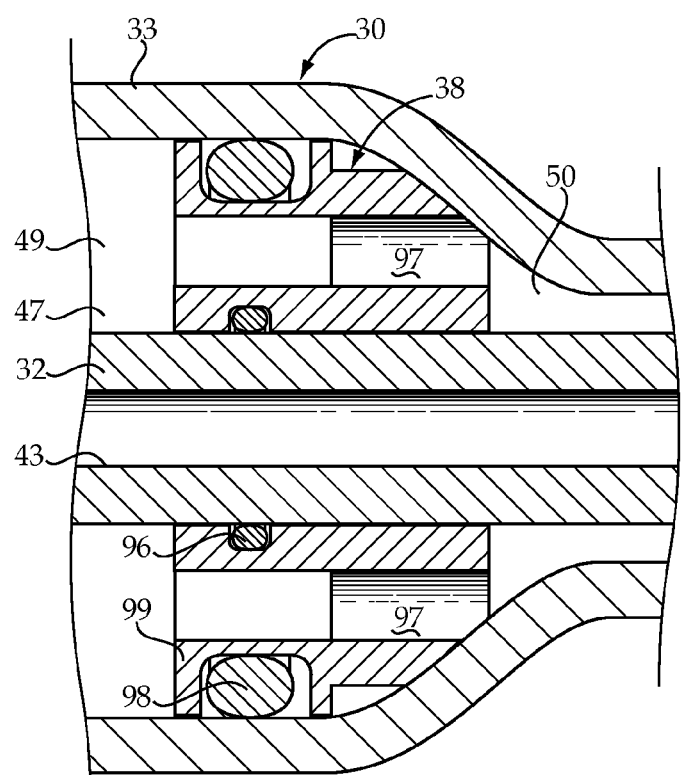
FIG. 9 is a side sectioned view through a co-axial quill assembly using a retainer according to another aspect of the present disclosure.

Referring to FIG. 9, a co-axial quill assembly with a retainer 38 according to an alternative embodiment of the present disclosure includes a metallic piece 99, which may comprise aluminum, with through holes 97 that fluidly connect upstream and downstream segments 49, 50 of the gaseous fuel conduit 47. This embodiment differs from the earlier embodiment in that the retainer 38 does not include an edge filter, which may be located elsewhere in the fuel system. In addition, this embodiment differs by including a first o-ring 96 that grips inner quill 32 and an outer o-ring 98 that grips outer quill 33 to maintain the matched pair of an inner an outer quill of each quill assembly 30 together during pre-installation handling. The illustrated o-rings 91, 96 and 98 for the retainer 38 may be chosen from a material that is resistant to the effects of explosive decompression. Although such a phenomenon may be unlikely, choosing such material may act as a precaution because the o-rings 91, 96 and 98 are immersed in a pressurized environment, and disassembly of the retainers 38 from the quills 32, 33 is intended to be difficult.

In all versions of the present disclosure, the inner quill 32 and the outer quill 33 of each co-axial quill assembly 30 are a matched pair such that a gage line 85 at an end 62 of inner quill 32 extends a pre-determined target distance Δ beyond a gage line 86 at the end 67 of outer quill 33. This ensures that the inner and outer quills 32, 33 seat on common conical seat 27 responsive to a pre-determined load on co-axial quill assembly 30 along axis 29. Thus, each co-axial quill assembly may be interchangeable with any other co-axial quill assembly in engine 10. However, one could expect that at least one outer quill 33 of one co-axial quill assembly 30 will not match the inner quill 32 of an other co-axial quill assembly 30 in engine 10. Thus, the co-axial quill assemblies are best pre-assembled prior to installation of the fuel system 20 into engine 10. The preassembled co-axial quill assemblies 30 are retained together during pre-installation handling by a retainer 38. The retainer 38 should resist the separation of the inner quill 32 from its matched outer quill 33 absent a forced disassembly during pre-installation handling. However, the retainer 38 may permit some relative movement along axis 29 between outer quill 33 and inner quill 32 such as what might occur during installation of fuel system 20 to engine 10. After installation, the retainers 38 are left in place and may be inert to operation of the fuel system 11. Forced disassembly means that the matched quill pair 32, 33, will not accidently separate, such as by being dropped or maybe even mishandled. The forced disassembly requires an intent and may be a tool(s) to separate one of the inner quill 32 and outer quill 33 from retainer 38. Being inert to operation of fuel system 20 means that fuel flows through or past retainer 38 without interfering with the flow to fuel injectors 25, even though the retainer may include an edge filter 36 for capturing liberated debris from fuel flow.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure finds specific application where proper sealing engagement of the inner and outer quills 32, 33 with the common conical seat 27 of each fuel injector 25 requires matched pairs of inner and outer quills that need to be retained together during pre-installation handling with a retainer 38.

Referring back to all of the FIGS. 1-4, a method of operating dual fuel engine 10 begins by assembling a dual fuel common rail system 20 to an engine housing 11. Gaseous fuel is supplied from the gaseous fuel common rail 22 to each of the plurality of fuel injectors 25 for a respective co-axial quill assembly 30. Likewise, liquid fuel from a liquid fuel common rail 21 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic engine controller 15 to the fuel injector 25. Also, liquid fuel from the fuel injector 25 is injected directly into engine cylinder 12 from the same fuel injector 25 responsive to a liquid fuel injection signal from electronic engine controller 15. Variations in gas fuel injection quantities among the plurality of fuel injectors 25 are reduced by damping pressure waves arriving from the gaseous fuel common rail 21 with a pressure damping chamber 48 defined by each respective co-axial quill assembly 30. During gaseous fuel injections, gaseous fuel arrives in quill chamber 52 from gaseous fuel passage 46. The gaseous fuel then flows in grooves of edge filter 36 with debris being trapped between the outer surface of edge filter 36 and the inner surface 69 of outer quill 33. This flow pattern may be encouraged by having mating geometry that encourages the sealing contact between retainer 38 and the various other components including inner quill 32, edge filter 36 and block 31. During the pre-assembly of each co-axial quill assembly 30, the predetermined target distance Δ is set as discussed earlier. One of the discussed strategies (e.g. o-ring, elevated seal lands, cone on cone or annular weld) may be utilized for sealing against leakage of gaseous fuel from between the outer quill 33 and the block 31.

During installation, the inner quill 32 may be clamped between the conical seat 53 of block 31 and the common conical seat 27 of the respective fuel injector 25. By utilizing blocks 31 for each co-axial quill assembly and by orienting them appropriately as described, dual fuel common rail system 20 facilitates construction of gaseous fuel common rail 21 and the liquid fuel common rail 22 by daisy chaining a plurality of co-axial quill assemblies 30 together utilizing identical gaseous fuel line segments 18, liquid fuel line segments 19 and associated fittings received in respective gaseous rail passages 45 and liquid rail passages 42. Both the pre-installation construction and the installation configuration shown serve to maintain the inner quill 32 of each co-axial quill assembly 30 out of contact with the respective outer quill 33.

The present disclosure addresses a previously unrecognized problem associated with undesirable, and maybe unpredictable, variations in gaseous fuel injection rates and quantities due to pressure fluctuations within the fuel injector 25 during gaseous fuel injection events. The present disclosure insightfully recognizes that a small flow area orifice in the liquid fuel supply inhibits the pressure fluctuations in the associated liquid fuel injection variations, whereas an enlarged volume pressure damping chamber 48 serves a similar purpose in reducing pressure fluctuations during gaseous fuel injection events within the respective fuel injectors 25.

Prior to assembling the fuel system 20, a plurality of quill assemblies 30 are preassembled to include a block 31, and inner quill 32 and an outer quill 33. During preassembly, dimensions are checked in order to match an inner quill 32 with an outer quill 33 of each quill assembly 30 such that the gage line 85 at an end of inner quill 32 extends a predetermined target distance Δ beyond a gage line 86 at the end of outer quill 33. This ensures that the inner and outer quills 32, 33 will seat and seal on the common conical seat 27 responsive to a predetermined load on co-axial quill assembly 30 along axis 29. After being matched, the inner and outer quills 32, 33 may be retained together during pre-installation handling with a retainer 38 positioned between the inner and outer quills 32, 33. Although not a necessity, the retainer 38 may also serve to keep the inner quill 32 and the outer quill 33 out of contact with one another. After the fuel system 20 is installed, the retainers 38 are left in place but are preferably inert to the operation of engine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A coaxial quill assembly for a dual fuel common rail fuel system comprising:
    a block defining a liquid fuel passage that opens into a quill chamber through a conical seat, and defines a gaseous fuel passage that opens into the quill chamber outside of the conical seat;
    an inner quill that defines a liquid fuel conduit extending between a first end and a second end, and the first end including an annular spherical surface resting in contact with, but unattached to, the conical seat;
    an outer quill with a hollow interior separating a first end from a second end, and the first end being received in the quill chamber;
    a gaseous fuel conduit extending between an outer surface of the inner quill and an inner surface of the outer quill;
    an annular seal for preventing gaseous fuel from escaping from the gaseous fuel conduit between the block and the outer quill;
    a retainer in contact with the outer surface of the inner quill and the inner surface of the outer quill for maintaining the inner quill with the outer quill during pre-installation handling, wherein the retainer and the inner surface of the outer quill define an edge filter having a plurality of filter passages that are distributed around, and oriented perpendicular to a centerline of the retainer; and
    a gage line at the second end of the inner quill extending a predetermined target distance beyond a gage line at the second end of the outer quill so that the inner and outer quills seat on a common conical seat responsive to a predetermined load on the block along an centerline.

2. The coaxial quill assembly of claim 1 wherein the retainer includes a metallic piece and a first O-ring trapped between the metallic piece and the inner quill.

3. The coaxial quill assembly of claim 2 wherein the metallic piece defines a plurality of through holes that fluidly connect upstream and downstream segments of the gaseous fuel conduit.

4. The coaxial quill assembly of claim 3 wherein the retainer includes a second O-ring trapped between the metallic piece and the outer quill.

5. The coaxial quill assembly of claim 1 wherein the retainer is connected to the outer quill with a metal to metal interference fit.

6. A dual fuel engine comprising:
    an engine housing that defines a plurality of cylinders;
    a dual fuel common rail system that includes exactly one fuel injector positioned for direct injection in each of the plurality of cylinders, a gaseous fuel common rail and a liquid fuel common rail that are fluidly connected to each fuel injector, and a coaxial quill assembly with inner and outer quills in sealing contact with a common conical seat of each fuel injector;
    the inner quill being out of contact with the outer quill for each coaxial quill assembly;
    the coaxial quill assembly includes a retainer in contact with an outer surface of the inner quill and an inner surface of the outer quill for maintaining the inner quill with the outer quill during pre-installation handling, wherein the retainer and the inner surface of the outer quill define an edge filter having a plurality of filter passages that are distributed around, and oriented perpendicular to an axis of the retainer; and
    the inner quill and the outer quill of each coaxial quill assembly are a matched pair such that a gage line at an end of the inner quill extends a predetermined target distance beyond a gage line at an end of the outer quill so that the inner and outer quills seat on the common conical seat responsive to a predetermined load on the coaxial quill assembly along the axis.

7. The dual fuel engine of claim 6 wherein each coaxial quill assembly includes:
    a block defining a liquid fuel passage that opens into a quill chamber through a conical seat, and defines a gaseous fuel passage that opens into the quill chamber outside of the conical seat;
    the inner quill defines a liquid fuel conduit extending between a first end and a second end, and the first end including an annular spherical surface loaded in contact with, but unattached to, the conical seat of the block;
    the outer quill having a hollow interior separating a first end from a second end, and the first end being received in the quill chamber;
    a gaseous fuel conduit extending between an outer surface of the inner quill and an inner surface of the outer quill;
    an annular seal for preventing gas from escaping from the gaseous fuel conduit between the block and the outer quill.

8. The dual fuel engine of claim 7 wherein the retainer includes a metallic piece and a first O-ring trapped between the metallic piece and the inner quill.

9. The dual fuel engine of claim 8 wherein the metallic piece defines a plurality of through holes that fluidly connect upstream and downstream segments of the gaseous fuel conduit.

10. The dual fuel engine of claim 9 wherein the retainer includes a second 0-ring trapped between the metallic piece and the outer quill.

11. The dual fuel engine of claim 6 wherein the retainer is connected to the outer quill with a metal to metal interference fit.

12. The dual fuel engine of claim 7 wherein the outer quill of at least one coaxial quill assembly is not a match for an inner quill of at least one other coaxial quill assembly.

13. A method of assembling a fuel system comprising the steps of:
    pre-assembling a plurality of quill assemblies to each include a block, an inner quill and an outer quill;
    fluidly connecting a first common rail and a second common rail to a plurality of fuel injectors with the plurality of quill assemblies by clamping the inner quill between a conical seat of the block and a common conical seat of a respective fuel injector;
    the pre-assembling step includes matching an inner quill and an outer quill for each of the quill assemblies such that a gage line at an end of the inner quill extends a predetermined target distance beyond a gage line at an end of the outer quill so that the inner and outer quills seat on the common conical seat responsive to a predetermined load on the coaxial quill assembly along an axis;
    retaining a matched inner and outer quills together during pre-installation handling with a retainer positioned between the inner and outer quills;
    leaving the retainers in place between the respective inner and outer quills after the fluid connecting step;
    supplying liquid fuel and gaseous fuel from the first and second common rails, respectively; and
    trapping debris in gaseous fuel flowing toward each respective fuel injector with an edge filter positioned between the retainer and an inner surface of the outer quill of each of the coaxial quill assemblies, wherein the edge filter comprises a plurality of filter passages that are distributed around, and oriented perpendicular to an axis of the retainer.

14. The method of claim 13 wherein an outer quill of at least one quill assembly is not a match for an inner quill of at least one other quill assembly.

15. The method of claim 13 wherein the pre-assembling step includes maintaining the inner quill of each coaxial quill assembly out of contact with the outer quill of the coaxial quill assembly.

* * * * *